United States Patent
Kokubun et al.

(10) Patent No.: US 10,466,038 B1
(45) Date of Patent: Nov. 5, 2019

(54) MOTION COMPENSATION SYSTEM FOR A SHEAROGRAPHY APPARATUS

(71) Applicant: BAE SYSTEMS Information and Electronic Systems Integration Inc., Nashua, NH (US)

(72) Inventors: Daniel N. Kokubun, Waipahu, HI (US); Sidney Pang, Kaneohe, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/125,349

(22) Filed: Sep. 7, 2018

(51) Int. Cl.
  *G01B 11/16* (2006.01)
  *G02B 17/00* (2006.01)
  *G01B 9/02* (2006.01)
  *G01J 9/02* (2006.01)

(52) U.S. Cl.
  CPC ........ *G01B 11/162* (2013.01); *G01B 9/02098* (2013.01); *G01J 9/0215* (2013.01); *G02B 17/00* (2013.01)

(58) Field of Classification Search
  CPC . G01B 11/162; G01B 9/02098; G01J 9/0215; G02B 17/00
  See application file for complete search history.

(56) References Cited

U.S. PATENT DOCUMENTS

| | | | | |
|---|---|---|---|---|
| 3,572,882 A | * | 3/1971 | Neumann | G03H 1/10 359/10 |
| 6,031,602 A | * | 2/2000 | Parker | G01J 9/0215 356/35.5 |
| 7,933,021 B2 | * | 4/2011 | De Boer | A61B 3/103 356/479 |
| 8,162,495 B2 | * | 4/2012 | Green | G02B 7/1827 359/853 |
| 8,717,577 B1 | * | 5/2014 | Kokobun | G01B 11/162 356/520 |
| 8,804,132 B1 | * | 8/2014 | Saxer | G01B 9/02098 356/520 |
| 9,476,700 B2 | | 10/2016 | Deweert et al. | |
| 9,818,181 B1 | * | 11/2017 | Acker | G01B 9/02096 |
| 2009/0168074 A1 | * | 7/2009 | Monchalin | G01N 21/1702 356/502 |
| 2012/0120410 A1 | * | 5/2012 | Sitter, Jr. | G01J 9/0215 356/520 |

(Continued)

*Primary Examiner* — Dominic J Bologna
(74) *Attorney, Agent, or Firm* — Finch & Maloney PLLC

(57) ABSTRACT

A motion compensation system for a shearography apparatus includes: an adjustable first fold mirror to reflect laser radiation to a receiving aperture of the shearography apparatus during separate pulse periods at corresponding angles of reflection; and corresponding second fold mirrors to reflect the laser radiation from a target surface to the first fold mirror during the respective pulse periods. The shearography apparatus moves with respect to the target surface between the separate pulse periods. The angles of reflection make the laser radiation reflected from the target surface via the respective second fold mirrors appear to the receiving aperture as if the shearography apparatus is stationary with respect to the target surface. In another system, the second fold mirrors are replaced by an adjustable second fold mirror to reflect the laser radiation from the target surface to the first fold mirror during the pulse periods at corresponding second angles of reflection.

20 Claims, 6 Drawing Sheets

(56) References Cited

U.S. PATENT DOCUMENTS

| | | | |
|---|---|---|---|
| 2014/0055792 A1* | 2/2014 | Tin | G01N 21/47 356/496 |
| 2015/0204729 A1* | 7/2015 | Kusunose | G01B 9/02098 356/521 |
| 2016/0320176 A1* | 11/2016 | Yang | G01M 11/081 |

* cited by examiner

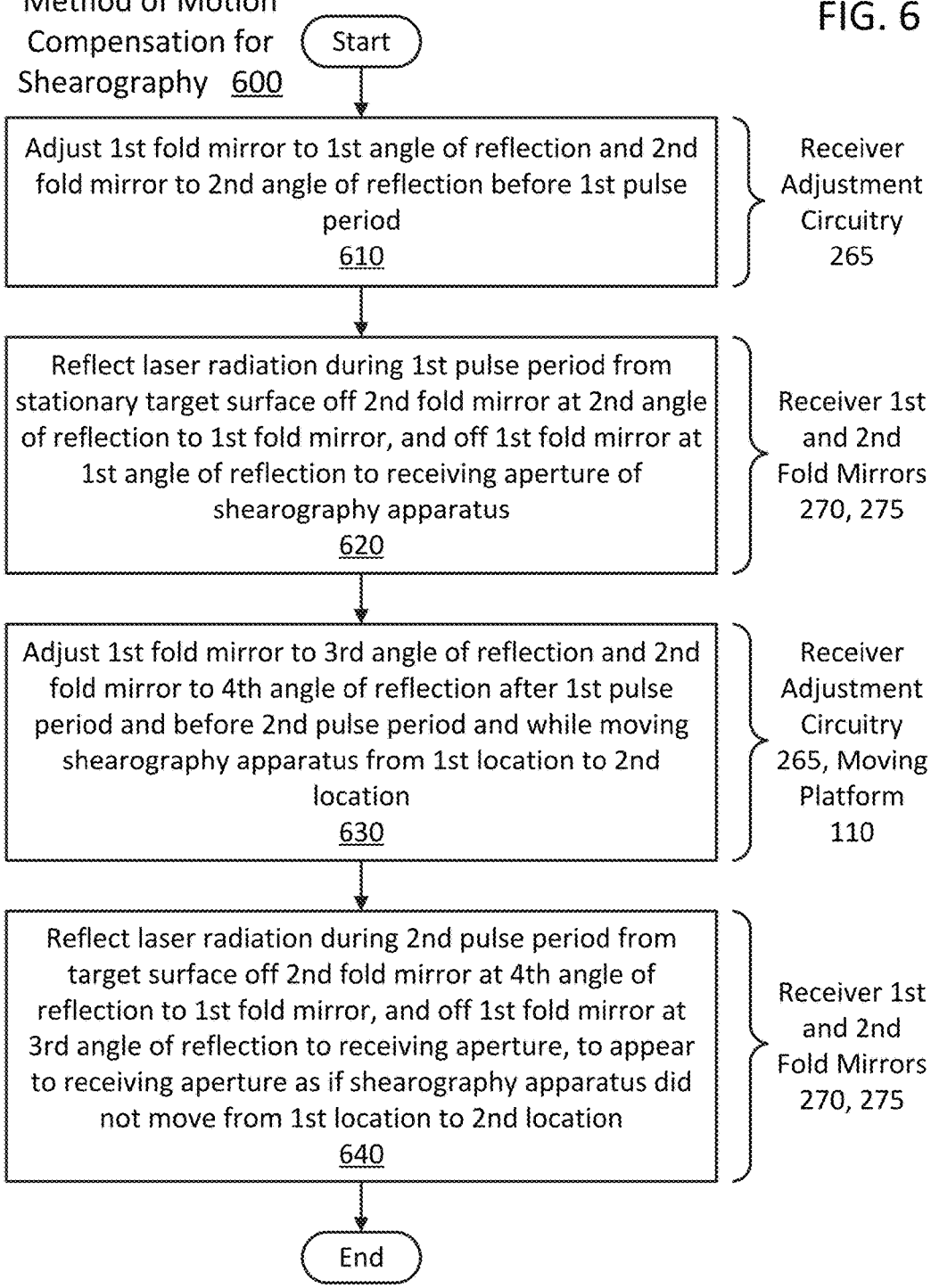

US 10,466,038 B1

MOTION COMPENSATION SYSTEM FOR A SHEAROGRAPHY APPARATUS

STATEMENT REGARDING FEDERALLY SPONSORED RESEARCH OR DEVELOPMENT

This invention was made with government support under contract N00014-16-C-3039 awarded by the U.S. Navy. The government has certain rights in the invention.

FIELD OF THE DISCLOSURE

This disclosure relates to a motion compensation system for a shearography apparatus to do motion-based shearography, including phase-resolved motion-based shearography. For example, the shearography apparatus can be for use on a moving platform or with respect to a moving target surface. Examples of such motion include a ground vehicle, an aircraft, a watercraft, a multi-terrain craft, a moving structure, a handheld device, or any other platform in motion, or in relative motion with respect to the target surface. For instance, this motion can be by intent, by inherent characteristics, or by characteristics of the environment to which the platform or target surface is subjected, to name a few.

BACKGROUND

Shearography, a type of shearing interferometry, is a noncontact or nondestructive technique used to measure or test surfaces and subsurfaces of products and materials, such as to inspect quality, measure strain, and analyze vibrations. Shearography can be performed, for example, using coherent light (such as from a laser) that is illuminating a target surface to be analyzed. The reflected light is imaged using an image-shearing device, which produces speckled patterns called specklegrams of the target surface. Shearograms are then generated by manipulating specklegrams taken at different points in time when the target surface has small changes in geometry. Shearography can be performed from a moving platform or of a moving target surface. However, there are a number of non-trivial issues associated with performing motion-based shearography.

BRIEF DESCRIPTION OF THE DRAWINGS

FIG. 6 is a flow diagram of an example method of motion compensation for a shearography apparatus, such as the shearography apparatus of FIG. 2 with the motion compensation system of FIG. 4, according to an embodiment of the present disclosure.

Figure 1:
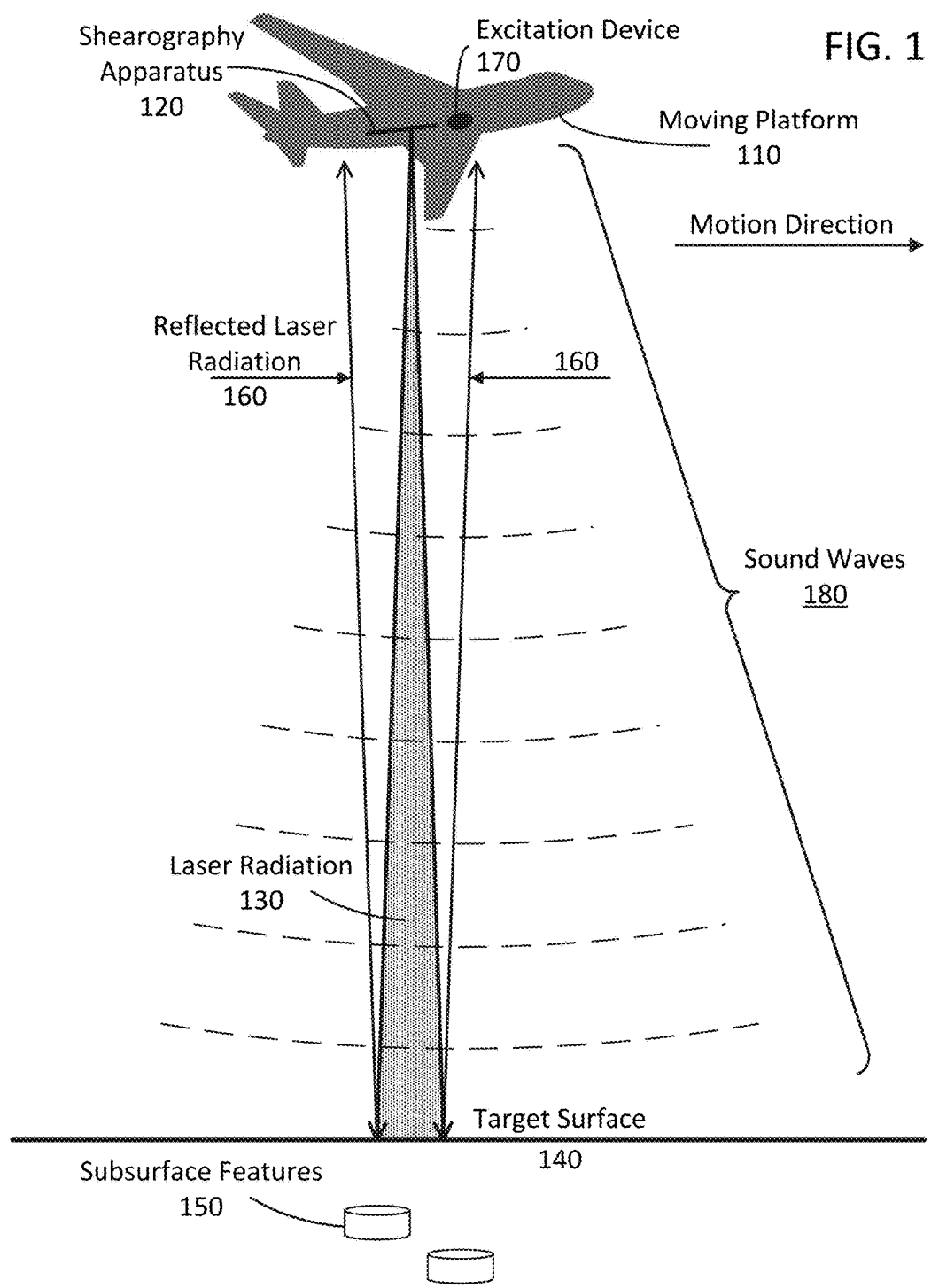
FIG. 1 is a schematic diagram of an example environment in which a motion compensation system for a shearography apparatus performing motion-based shearography is deployed, according to an embodiment of the present disclosure.

Although the following Detailed Description will proceed with reference being made to illustrative embodiments, many alternatives, modifications, and variations thereof will be apparent to those in light of the present disclosure.

DETAILED DESCRIPTION

A motion compensation system for a shearography apparatus is provided. In an embodiment, the shearography apparatus performs motion-based shearography of a target surface (such as from a moving platform or of a moving target surface). The shearography apparatus is on a moving platform, such as an airplane or ground vehicle, that moves with respect to the target surface. In another example use case, the shearography apparatus is stationary, with the target surface moving. In an embodiment, the motion compensation system includes an adjustable fold mirror and multiple (e.g., two to four) stationary fold mirrors. The adjustable fold mirror reflects laser radiation to a shearography image plane or receiving aperture during a corresponding number of (e.g., two to four) separate pulse periods at a corresponding number of (e.g., two to four) angles of reflection. The stationary fold mirrors reflect the laser radiation from a target surface to the adjustable fold mirror during the respective pulse periods. The angles of reflection (of the adjustable fold mirror) make the laser radiation reflected from the target surface via the respective stationary fold mirrors appear to the image plane as if the shearography apparatus is stationary with respect to the target surface.

In another embodiment, the two to four stationary fold mirrors are replaced with a second adjustable fold mirror. The second adjustable fold mirror reflects the laser radiation from the target surface to the first adjustable fold mirror during the separate pulse periods at corresponding second angles of reflection while the first adjustable fold mirror is at corresponding first angles of reflection. Here, the first and second angles of reflection make the laser radiation reflected from the target surface appear to the image plane or receiving aperture as if the shearography apparatus is stationary with respect to the target surface. Numerous other embodiments and variations will be apparent in light of the present disclosure.

General Overview

As mentioned above, there are a number of non-trivial performance issues associated with performing shearography from a moving platform or of a moving target surface. Shearography requires multiple specklegrams obtained under as close to identical conditions as possible. For instance, for the specklegrams to be comparable, the laser radiation used for the different specklegrams must be the same. This includes, for example, the same wavelength, same emission location, same angle to the target surface, same return angle from the target surface, same receiving or imaging location (e.g., same receiving aperture), to name a few. Without precise alignment of the laser radiation (both outgoing and incoming) and the same radiation for each of the specklegrams (for example, up to four specklegrams needed for phase-resolved shearography), the resulting comparisons will be compromised, and their data may not be useful. This can be particularly challenging when the target surface is moving with respect to the shearography platform.

Accordingly, in an embodiment of the present disclosure, a motion compensation system is provided with a shearography apparatus for motion-based shearography of a target surface, such as from a moving platform (e.g., aircraft or vehicle), or of a moving target surface, or both. The target surface can be, for example, the ground or an exposed side of a structure or piece of material, or a moving object such as a ground vehicle or plane. The moving platforms, if applicable, can be, for example, airborne (such as helicopters or fixed-wing aircraft) or ground based, such as vehicles. The vehicles can be, for instance, manned or unmanned ground vehicles (UGVs). Embodiments of the present disclosure extend the range of systems and platforms that can support motion-based shearography systems.

In some embodiments, motion-based shearography has two paths compensated by the motion compensation system: a transmitting path of the outgoing laser radiation; and a receiving path of the incoming reflected laser radiation from the target surface. As will be appreciated in light of this disclosure, both paths can be compensated for motion of the target surface relative to the shearography platform, lest the resulting specklegrams may not be sufficiently comparable. In some embodiments, both paths use the same motion compensation components, such as concurrently or simultaneously. In other embodiments, the paths use different motion compensation components.

In some embodiments, a single stepping mirror galvanometer (galvo mirror) is used in conjunction with a plurality of (e.g., two to four) stationary or fixed mirrors to compensate the motion. Each stationary mirror produces a different corresponding specklegram, such as a different corresponding one of four specklegrams that may be needed for phase-resolved shearography. For simplicity, the mirrors can be simple fold mirrors, though the present disclosure is not so limited. The mirror arrangement can be used with the transmitter of the laser radiation or the receiver of the reflected laser radiation for the shearography apparatus, or for both. In some such embodiments, the transmitter and the receiver concurrently use different portions of the same mirrors for processing the same laser pulse. For example, for remote shearography at distances of up to 500 feet, there is less than a microsecond (µs) delay between the transmitted laser radiation from the laser source or transmitting aperture and the reflected laser radiation from the target surface reaching the imaging plane or receiving aperture in the shearography apparatus.

For ease of description, embodiments are often described in terms of two to four mirrors, pulse periods, specklegrams, and the like. However, other embodiments are not so limited. In some embodiments, five, six, or more mirrors, angles of elevation, pulse periods, and the like are provided. Further, in some embodiments, pulses can be added, or acquired continually, and processed in groups of a number (e.g. subsets of two to four) suitable for particular conditions. Still further, multiple sets of exposures or specklegrams (e.g., of slightly displaced locations of the target surface) can be acquired concurrently (such as in an interleaved fashion) in some embodiments over the course of the platform's motion relative to the target surface, and those specklegrams of the same location processed as part of the same shearogram to produce a corresponding multiple shearograms (one for each location). By way of example, timing permitting, three different (e.g., slightly displaced) locations can be captured as a first exposure or specklegram for a corresponding three different shearograms, all using the same stationary mirror. These can be soon followed by three more exposures or specklegrams of the same three locations, this time using the next stationary mirror, and so on for any other stationary mirrors.

The stationary mirrors are spaced apart from each other in the direction of motion (e.g., horizontal) between the shearography apparatus and the target surface. For example, in one embodiment, the stationary mirrors are one feet apart from each other in the horizontal directions, which is the motion direction. In some embodiments, the stationary mirrors are also separated in the direction of laser transmission or reception (e.g., vertical) between the shearography apparatus and the target surface. For example, in one embodiment, the stationary mirrors are spaced apart horizontally (e.g., motion direction) and vertically (e.g., laser direction) to prevent overlap of the stationary mirrors when imaging different specklegrams. In some embodiments, each stationary mirror is fixed at a different corresponding angle of reflection to direct outgoing or incoming laser radiation from or to the stepping mirror.

In some such embodiments, the stepping mirror is a galvo mirror capable of rapidly switching from one angle of reflection to another, such as stepping and settling between angles of reflection with an inter-pulse period of about 1.5 milliseconds (ms) or better. The stepping mirror adjusts (e.g., pivots) the angle of reflection for the transmitter or receiver path (between the laser source or the imaging plane, respectively, and the corresponding stationary mirror) for each of the stationary mirrors. In some further such embodiments, the laser radiation is pulsed, such as for 50 to 500 nanoseconds (ns) (e.g., 100 ns), when the corresponding secondary mirror is in the proper orientation (such as directly overhead of the target surface). In some other such embodiments, the laser pulses are shorter, such as a few (e.g., 5-7) nanoseconds.

In some other such embodiments, the duration of the laser pulse is not relevant. After imaging the corresponding reflected laser radiation for one pulse and one specklegram (e.g., performing one shot of the shearogram), the shearography apparatus moves with respect to the target surface while the stepping mirror adjusts to the next angle of reflection for the next stationary mirror. Accordingly, the laser radiation is transmitted to the target surface and the reflected laser radiation is received from the target surface as if the shearography apparatus is stationary with respect to the target surface.

In some such embodiments, by using separate stationary mirrors appropriately separated horizontally and vertically for each shot (and its corresponding specklegram) in the motion-based compensation system, the shearography apparatus supports higher platform speeds than possible with comparable compensation systems. In some such embodiments, the stepping and stationary mirrors are only used for the receiving path, while the transmitting path uses two to four separate laser sources whose corresponding output beams are spaced in the motion direction the same as the stationary mirrors. Accordingly, the transmitting laser radiation appears to the target surface for each shot (and its corresponding specklegram) as if it is coming from a stationary platform.

In still other embodiments, a first stepping mirror (e.g., galvo mirror) is used in conjunction with a second stepping mirror (e.g., another galvo mirror) to compensate the motion. The first stepping mirror works similarly to the stepping mirror described in the above embodiments. The second stepping mirror replaces the two to four stationary mirrors with a single adjustable mirror that adjusts (e.g., pivots) to different angles of reflection (such as two to four different angles of reflection) corresponding to different locations of incoming (received or reflected) or outgoing (transmitted or emitted) laser radiation. Since the movement in the motion direction with one mirror is significantly less than with four nonoverlapping stationary mirrors of the same size, this technique is more suitable for situations with lower platform speed or faster stepping times.

Similar to the multiple stationary mirror embodiments, the first and second stepping mirrors adjust (e.g., pivot) to corresponding angles of reflection for each shot (and its corresponding specklegram) so that the laser radiation is transmitted to the target surface and the reflected laser radiation is received from the target surface as if the shearography apparatus is stationary with respect to the target surface. In one example embodiment, each stepping mirror steps and settles with an inter-pulse period of approximately 1.5 ms. In other such embodiments, the stepping mirrors have settling times that differ from 1.5 ms, such as less than 1.5 ms (e.g., to support faster frame rates).

One or more embodiments of the present disclosure provide additional motion compensation solutions for motion-based shearography apparatuses, such as airborne and ground-based shearography apparatuses. One or more embodiments of the present disclosure extend the range of platforms, and platforms speeds (relative to the target surfaces) that can support shearography apparatuses. In any such embodiments, shearography motion compensation can be provided by a combination of stepping galvanometer mirrors and fixed mirrors. The mirror configurations can be adjusted to provide a linear translation at the apparent exit aperture (or exit pupil) of the receiver system, and make it appear to the image plane or receiving aperture (e.g., receiving lens) as if the shearography system is not moving with respect to the target surface. For example, in some embodiments, motion compensation is achieved when this translation distance is of equal magnitude but opposite direction as the platform motion (relative to the target surface), and this correction is applied for the four shots (specklegrams or specklegram images) used to perform the shearography (such as the four shots needed for phase-resolved shearography). In so doing each of the four specklegrams is collected with the apparent exit aperture located in the same position in space, which is necessary for the shearography receiver to compensate the relative motion of the shearography apparatus with respect to the target surface.

Some such embodiments may provide improvements relative to comparable shearography motion compensation techniques in that they extend motion compensation to a wider range of platform speeds than possible with other techniques, and they use the entire receiver aperture for each shot or specklegram, which facilitates the use of lower power lasers. Use of lower power lasers can reduce the shearography apparatus (e.g., in size, weight, and power usage).

Shearography is commercially used to inspect articles for subsurface defects such as in pottery, statues, artwork, tires, composites, and panels. One or more embodiments of the present disclosure enhance comparable shearography techniques that must be stationary while being used, such as on a tripod. According to one or more embodiments, adding motion compensation makes such shearography equipment easier to use, less sensitive to motion, able to inspect large areas in shorter times, and possibly be operable hand held.

While the present disclosure is presented mostly from the perspective of motion compensation for shearography, other embodiments are not so limited. For example, in some embodiments, the motion compensation techniques are applied to any actively-illuminated imaging, ranging, or vibrometry system. In some such embodiments, the motion compensation techniques are used in cases where it is important to precisely measure motion-sensitive phase, polarization, or spectrum. For example, in some such embodiments, the motion compensation techniques are used in an imaging system that shifts the polarization or color of the transmitter and receiver to do precision polarimetry or spectral analysis. In some other such embodiments, the motion compensation techniques are used to extend the time over which a moving laser-Doppler vibrometer (LDV) can look at a surface before losing coherence. In still other such embodiments, the motion compensation techniques are used to extend the usefulness of holography or electronic speckle pattern interferometry (ESPI) to moving systems or moving scenes. Numerous other example embodiments and configurations will be apparent in light of this disclosure.

System Architecture

FIG. 1 is a schematic diagram of an example environment in which a motion compensation system for a shearography apparatus 120 is deployed, according to an embodiment of the present disclosure. In some embodiments, the shearography apparatus 120 is deployed on a moving platform 110, such as an aircraft or ground vehicle, to sense a stationary target surface 140, such as the ground, with the moving platform 110 moving parallel to the target surface 140. In some other embodiments, the shearography apparatus 120 is deployed on a stationary platform to sense a moving target surface. In still some other embodiments, both the shearography apparatus 120 and the target surface 140 are moving, including with respect to one another.

The speed of the moving platform 110 is not limited, though as described in further detail below, depending on factors such as the component speed (like with galvo mirrors), supporting speeds greater than several hundred miles per hour may be impractical because of the corresponding distances needed between different components (such as stationary mirrors). However, in some embodiments, platform-surface relative motion in excess of several hundred miles per hour is exploited for some applications, such as where framing faster than 1.5 ms is acceptable. For example, when the material being imaged changes by nanometers in microseconds, faster platform speeds and framing rates can be used to image the target surface quicker. This could be done with reasonable mirror spacings, though the galvo speed might need to be very fast in such cases.

The shearography apparatus 120 includes several components, such as a laser source for emitting pulses of laser radiation 130. The laser source is not limited in wavelength. While for convenience of description the laser radiation 130 is usually described as being emitted perpendicular to the moving platform 110 or target surface 140, the present disclosure is not so limited, and in other embodiments, the laser radiation 130 is oblique to the moving platform 110, the target surface 140, or both. The laser source provides coherent light, which is used to produce the regular image and the offset (or sheared or laterally displaced) image that combine to form a speckled pattern (such as a grayed-out speckled pattern) or specklegram.

Multiple such specklegrams produced under the same relative conditions (e.g., type and direction of laser radiation) can be combined into a shearogram for shearography analysis. For example, the specklegrams can be registered (to align pixels corresponding to the same physical locations) and digitally summed or differenced to make shearography comparisons. This digital image processing produces fringe or butterfly patterns, such as lobes or rings, that are characteristic of shearography comparisons under different conditions (such as under different loads or excited states). Multiple such specklegrams can also be produced with different phase offsets (e.g., no offset, one-quarter wavelength offset, one-half wavelength offset, and three-quarters wavelength offset) to allow phase-resolved shearography. In some embodiments, different four-pulse phase-resolved phase-stepping sequences are used, such as zero offset, one-quarter wavelength offset, three-quarters wavelength offset, and one-wavelength offset (or back to zero offset), with equal time intervals between pulses. Many other sequences are also useable.

The emitted laser radiation 130 is directed to a target surface 140, such as the ground. When collected under different conditions, such as different loads, different vibrations, different stresses, and the like), specklegrams can be compared (such as mathematically operated on to produce a shearogram) to identify surface and subsurface weaknesses or features, such as subsurface features 150 (e.g., artifacts, unexploded ordnance or mines, tunnels, to name a few). The laser radiation 130 reflects or scatters (e.g., back scatters) off the target surface 140 and goes in different directions. Some of the reflected laser radiation 160 returns to the shearography apparatus 120, where it can be imaged using an image-shearing device to produce a specklegram. In some embodiments, multiple such specklegrams are obtained in a relatively brief period of time, such as ten milliseconds (ms), by a laser source and an image-shearing camera, and combined (such as with sum or difference operators, to produce a shearogram).

While obtained from a moving platform 110, a motion compensation system (as described in further detail elsewhere in this disclosure) is used to make it appear to the imaging plane or receiving aperture (e.g., receiving lens) of the image-shearing camera as if the shearography apparatus 120 and the target surface 140 are stationary with respect to each other.

To produce the different stresses or loads between shots or specklegrams, in some embodiments, the moving platform 110 uses an excitation device 170, such as a sound generator. The excitation device 170 delivers sound waves 180 to the target surface 140. While the laser radiation 130 travels almost a million times faster than the speed of sound, in some embodiments, the sound waves 180 are timed to be contacting the target surface 140 when the laser radiation 130 is emitted. As such, the time difference between successive laser pulses or shots (e.g., a few ms), is sufficient for different portions of the sound waves 180 to be contacting the target surface 140. This produces the difference in surface and subsurface conditions for generating a shearogram and doing shearography analysis of the collected specklegrams by analyzing the shearogram. In some embodiments, the excitation is provided elsewhere, such as near the target surface using a vibration or sound device.

Figure 2:
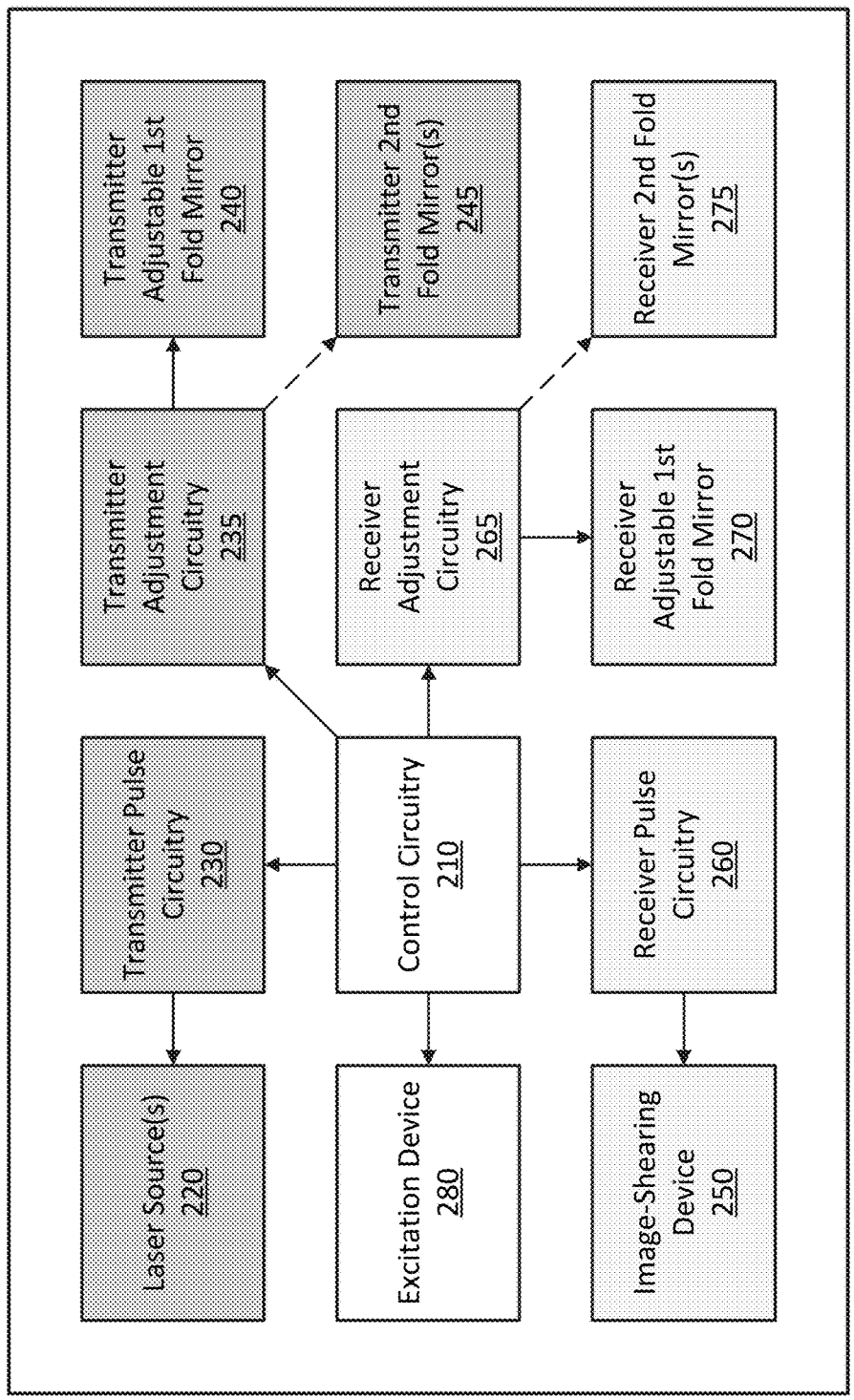
FIG. 2 is a block diagram of an example shearography apparatus having a motion compensation system, according to an embodiment of the present disclosure.

FIG. 2 is a block diagram of an example shearography apparatus 200 having a motion compensation system, according to an embodiment of the present disclosure. The circuitry of the shearography apparatus 200 can be fabricated, for example, as an integrated circuit (IC) using standard IC fabrication techniques such as photolithography. For example, the circuitry can be fabricated in a semiconductor fabrication technology, such as complementary metal-oxide semiconductor (CMOS), p-type MOS (PMOS), or n-type MOS (NMOS), to name a few.

In addition, the laser optics can use commercially available components such as a visible pulse laser diode, a beam spreader, and corresponding receiving optics to perform the image shearing and focus the reflected laser radiation on an array of pixels having sensors that are sensitive to the emitted laser radiation (e.g., such as the emitted wavelength or wavelengths, or the emitted wavelength range or ranges). For example, in some embodiments, the image-shearing device includes an interferometer and an adjustable phase separator for offsetting one of the two exposures used to produce a specklegram by different fractions of the wavelength of the emitted laser radiation (e.g., to perform phase-resolved shearography).

While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. As will be further appreciated, a circuit as used herein is a physical structure capable of carrying out one or more functionalities as variously provided herein. For example, the structure can be hardware such as purpose-built semiconductor (e.g., gate-level logic or application specific integrated circuit (ASIC)) or a printed circuit board populated with discrete components configured and arranged to carry out the various functionalities provided herein. Numerous such embodiments and configurations will be appreciated in light of this disclosure.

In some embodiments, the circuitry of the shearography apparatus 200 is implemented in hardware or software, such as a custom circuit or a field programmable gate array (FPGA) configured to carry out the function of the circuit. In some embodiments, the circuitry of the shearography apparatus 200 is implemented through general-purpose computer hardware configured (e.g., through software, firmware, programmable logic, to name a few) to carry out the tasks assigned to the circuit.

The shearography apparatus 200 includes two principal paths: a transmitting path for generating and emitting the laser radiation to a target surface undergoing shearography analysis; and a receiving path for receiving the laser radiation reflected off the target surface. The transmitting components in the shearography apparatus 200 of FIG. 2 have a dark shade while the receiving components have a light shade. Motion compensation is accomplished by having a number of different transmitting locations and receiving locations (e.g., through adjustable mirrors, such as mirror galvanometers or galvo mirrors capable of adjusting angles of reflection in a matter of milliseconds (ms), such as 1.5 ms) to make it appear to the image-shearing device 250 of the shearography apparatus 200 that the target surface is remaining stationary with respect to the image plane or receiving aperture of the image-shearing device 250.

The transmitting path includes a laser source 220, transmitter pulse circuitry 230, transmitter adjustment circuitry 235, a transmitter adjustable first fold mirror 240, and one or more transmitter second fold mirrors 245. In some embodiments, the laser source 220 is a source of coherent light, such as a pulse laser diode. The laser radiation emitted by the laser source 220 can be any wavelength compatible with the image-shearing device of the shearography apparatus 200, such as visible light or invisible light (e.g., ultraviolet or infrared). In some embodiments, the laser source 220 is a point source of light and uses a beam spreader to widen the beam such that a suitably sized portion of the target surface (e.g., two-meter diameter circle) is illuminated. The transmitter pulse circuitry 230 controls the laser source 220, such as when and for how long to emit the laser radiation. The transmitter adjustment circuitry 235 controls the transmitter adjustable first fold mirror 240, such as when and what angle of reflection to set the first fold mirror 240 to coincide with the emitted laser radiation.

In some embodiments, there are two or more transmitter second fold mirrors 245 (e.g., stationary or fixed mirrors), whose corresponding angles of reflection do not adjust, or do not adjust during the period of collection of shearography data for comparable specklegrams. Each of the second fold mirrors 245 corresponds to a different pulse or burst or emission period of the laser source 220, such as for generating corresponding different shots or specklegrams. In some such embodiments, the adjustment circuitry 235 adjusts (e.g., pivots) the first fold mirror 240 to different corresponding angles of reflection between laser emissions, to direct the laser emissions or pulses to the respective second fold mirrors 245.

In some other embodiments, there is one transmitter adjustable second fold mirror 245, and it is controlled by the adjustment circuitry 235. In some such embodiments, there are two or more first angles of reflection for the first fold mirror 240 and a corresponding two or more second angles of reflection for the second fold mirror 245. Each pair (one first angle of reflection, one second angle of reflection) of first and second angles of reflection is for adjusting the first fold mirror 240 and the second fold mirror 245, respectively, to the correct orientation to reflect the corresponding laser pulse from the laser source 220 to the target surface.

In some embodiments, the transmitting path includes a corresponding two or more laser sources 220 in place of the adjustment circuitry 235, the first fold mirror 240, and the second fold mirrors 245. The laser sources 220 are arranged and oriented to emit the laser radiation as if the first fold mirror 240 and second fold mirrors 245 were being used instead. The pulse circuitry 230 controls each laser source 220 to emit its respective pulse at the correct time, in a manner similar to directing the single laser source 220 to emit the respective pulses when the first fold mirror 240 and the second fold mirrors 245 were being used.

The receiving path includes an image-shearing device 250 for producing specklegrams, receiver pulse circuitry 260, receiver adjustment circuitry 265, a receiver adjustable first fold mirror 270, and one or more receiver second fold mirrors 275. In some embodiments, the image-shearing device 250 is an image-shearing camera 250 capable of focusing and imaging a first portion of the received laser radiation emitted by the laser source 220 and reflected off the target surface to make a first image, and focusing and imaging a second portion of the received reflected laser radiation to make a sheared (or laterally displaced) version of the first image that is superimposed on the first image to produce a speckle pattern or specklegram. In some embodiments, the image-shearing device 250 includes optics to adjust a length of the light path of the first image to produce phase offsets of the reflected laser radiation (such as no offset, one-quarter wavelength offset, three-quarters wavelength offset, and one wavelength offset) to perform phase-resolved shearography.

In some embodiments, the motion compensation techniques extend to images with multiple phase offsets across the entire image. For instance, in some such embodiments, phase-resolved shearograms are computed from images in which multiple phase offsets are simultaneously encoded, for example via polarization multiplexing. In such embodiments, motion compensation as discussed herein can be used to capture the temporal changes of interest in a set of two or more phase-multiplexed specklegrams.

The receiver pulse circuitry 260 controls the image-shearing device 250, such as when and for how long to receive the reflected laser radiation, whether and how much phase delay to add to the receiving path (such as to perform phase-resolved shearography), and the like. The receiver adjustment circuitry 265 controls the receiver adjustable first fold mirror 270, such as when and what angle of reflection to set the first fold mirror 270 to coincide with the received laser radiation reflected from the target surface via the one or more second fold mirrors 275.

In some embodiments, there are two or more receiver second fold mirrors 275 (e.g., stationary or fixed mirrors), whose corresponding angles of reflection do not adjust, or do not adjust during the period of collection of shearography data for comparable specklegrams. Each of the second fold mirrors 275 corresponds to a different pulse or burst or emission period of the laser source 220 reflecting off the target surface, such as for generating corresponding different specklegrams (from which a shearogram is produced). In some such embodiments, the adjustment circuitry 265 adjusts (e.g., pivots) the first fold mirror 270 to different corresponding angles of reflection between received laser reflections, to direct the laser reflections (e.g., pulses) from the respective second fold mirrors 275 to the image plane or receiving aperture (e.g., receiving lens) of the image-shearing device 250.

In some other embodiments, there is one receiver adjustable second fold mirror 275, and it is controlled by the adjustment circuitry 265. In some such embodiments, there are two or more first angles of reflection for the first fold mirror 270 and a corresponding two or more second angles of reflection for the second fold mirror 275. Each pair (one first angle of reflection, one second angle of reflection) of first and second angles of reflection is for adjusting the first fold mirror 270 and the second fold mirror 275, respectively, to the correct orientation to reflect the corresponding laser pulse reflected from the target surface to the image plane or receiving aperture of the image-shearing device 250.

The shearography apparatus 200 further includes control circuitry 210 to control the transmitter pulse circuitry 230, transmitter adjustment circuitry 235, receiver pulse circuitry 260, and receiver adjustment circuitry 265. For the motion compensation system to work while the shearography apparatus 200 is moving with respect to the target surface, the pulses of laser radiation from the laser source 220 have to be emitted and received at the target surface as if the shearography apparatus 200 is stationary with respect to the target surface. In addition, the reflected laser radiation from the target surface has to be received by the second fold mirrors 275 and first fold mirror 270 and directed to the image plane or receiving aperture of the image-shearing device 250 as if the shearography apparatus 200 is stationary with respect to the target surface.

To accomplish this motion compensation, in some embodiments, the control circuitry 210 monitor's the relative motion of the shearography apparatus 200 with respect to the target surface (e.g., the speed of a moving platform carrying the shearography apparatus 200 performing shearography of a stationary target surface). At corresponding moments (e.g., when the movement of the platform is equal to the separation of consecutive receiver second fold mirrors 275, the control circuitry 210 controls the transmitter pulse circuitry 230 and receiver pulse circuitry 260 to process the laser emission for the next shot. In addition, at an earlier time (such as at the end of the laser emission for the previous shot), the control circuitry 210 controls the transmitter adjustment circuitry 235 and receiver adjustment circuitry 265 to adjust (e.g., pivot) the transmitter first fold mirror 240 and receiver first fold mirror 270, respectively, for the next shot. In some such embodiments, such as when the transmitter second fold mirror 245 and the receiver second fold mirror 275 are adjustable, the control circuitry 210 controls the adjustment circuitry to control their respective second fold mirrors for the next shot as well.

For each target surface portion to be analyzed by the shearography apparatus 200, this process is repeated (such as two, three, or four times) so that the corresponding pulses or emissions of laser radiation at the target surface are processed for the shearography. Each pulse is used to generate a different specklegram of the target surface using the image-shearing device 250. A specklegram is a laterally displaced pair of images that are superimposed to generate a speckle pattern. Multiple specklegrams of a target surface under different conditions are collected and compared (e.g., differenced to produce a shearogram) to reveal defects or features on the surface or below the surface. In a motion-based shearography system according to an embodiment of the present disclosure, the laser pulses are emitted at corresponding moments over a period of time along the same outbound path from the moving platform and terminating at the target surface.

To make meaningful comparisons between specklegrams (such as difference patterns, fringe patterns, or first-order derivatives of surface displacements, also known as shearograms), the outgoing laser radiation for the different shots or specklegrams should reach the target surface from the same angle. The other characteristics of the pulses of laser radiation should also be the same, such as being the same strength and wavelength. For similar reasons, the reflected laser radiation off the target surface for the different shots or specklegrams should reach the image-shearing device (or platform) from the same angle. Here, the motion compensation system (or platform) moves with respect to the target surface over the period of time. The emitted pulses of laser radiation reflect off the target surface and back to the motion compensation system at the corresponding moments over the period of time. The reflected pulses travel along the same inbound path emanating from the target surface (to produce comparable specklegrams, from which a shearogram is generated).

In some embodiments, the motion compensation system includes two to four transmission paths and a corresponding two to four receiving paths to perform motion-based shearography, including partial phase-resolved shearography with three transmission paths and three receiving paths, and complete phase-resolved shearography with four transmission paths and four receiving paths. In some such embodiments, the transmitting paths and the receiving paths use an adjustable first fold mirror that can be shared by the transmitting paths and the receiving paths or be a separate first fold mirror for the transmitting paths and for the receiving paths. The first fold mirror (or mirrors) adjusts (e.g., pivots) its angle of reflection between image capturing for each shot.

In some such embodiments, the two to four transmitting paths and the corresponding two to four receiving paths use a corresponding two to four stationary or fixed second fold mirrors that can be shared by the respective transmitting paths and the respective receiving paths or be separate second fold mirrors for the respective transmitting paths and for the respective receiving paths. The second fold mirrors (for any set of paths, or for both sets of paths if shared) have different corresponding angles of reflection between them and are spaced apart in the motion direction to compensate for the motion to their corresponding image capturing for each shot. In some other such embodiments, the transmitting paths and the receiving paths use an adjustable second fold mirror that can be shared by the transmitting paths and the receiving paths or be a separate second fold mirror for the transmitting paths and for the receiving paths. The adjustable second mirror (or mirrors) pivots to adjust its angle of reflection (and its transmitting or receiving location in the motion direction, to some extent) between image capturing for each shot.

In some embodiments, the assumed travel time of the laser radiation is no more than one microsecond (μs), such as for a maximum remote sensing range of 500 feet (1000 feet round trip). Accordingly, when compared to periods of time of at least a couple milliseconds between pulses, the laser radiation travel time is not a significant factor. The motion compensation system further includes adjustment circuitry to adjust the first fold mirror (or mirrors) to the corresponding angles of reflection. In some embodiments, the adjustments take place between laser pulses (e.g., after transmitting and receiving one pulse, but before transmitting and receiving the next pulse). It should be noted that there is no limit to the assumed travel time of the laser radiation, and in some other embodiments, the travel time is larger, such as two or three μs, with the corresponding motion compensation adjusted as would be apparent in light of this disclosure.

In some embodiments, additional mirrors are used, such as to further fold the transmitting or receiving paths, or to increase the number of transmitting or receiving paths (e.g., to five, six, or more). In some embodiments, the shearography apparatus includes an excitation device 280, such as a sound device for emitting sound waves, to stress or excite the target surface while performing the shearography. For the target surface to produce meaningful specklegrams for comparing (such as to produce a shearogram), they should be collected while the target surface is undergoing different stresses, loads, or vibrations. When performing motion-based shearography, where the shots or specklegrams are collected over a relatively brief time (such as ms), the target surface should be undergoing continuous and varying stress, loads, or vibrations to capture meaningful and comparable specklegrams.

Figure 3:
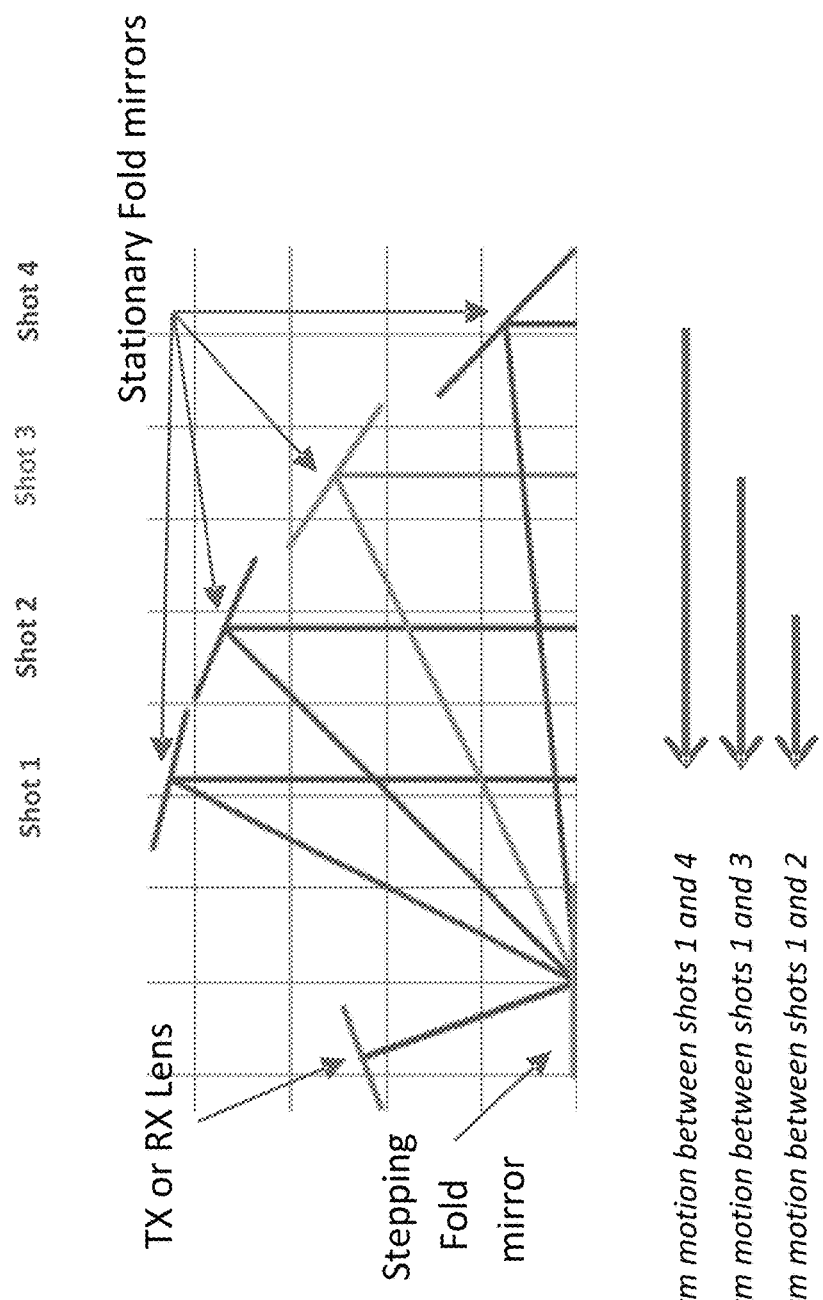
FIG. 3 is a schematic diagram of an example motion compensation system for a shearography apparatus, such as the shearography apparatus of FIG. 2, according to an embodiment of the present disclosure.

FIG. 3 is a schematic diagram of an example motion compensation system 300 for a shearography apparatus, such as the shearography apparatus 200 of FIG. 2, according to an embodiment of the present disclosure. The shearography apparatus is for performing shearography of a target surface. The motion compensation system 300 is on a moving platform (or in some other embodiments, a stationary platform while the target surface is moving), with horizontal arrows from right to left indicating the relative motion of the platform with respect to the target surface over time. Four separate paths (which can be transmitting (TX) paths, receiving (RX) paths, or shared paths when sharing mirrors between transmitting and receiving) are illustrated in FIG. 3, each with its own shot (labeled shot 1, shot 2, shot 3, and shot 4, in time order from left to right). Each path further has a corresponding stationary fold mirror and is configured to capture a corresponding one of the four shots (and its corresponding specklegram) for performing phase-resolved shearography.

Each stationary fold mirror is set to a different corresponding angle of reflection, is at a different corresponding distance in the horizontal (motion) direction and is at a different corresponding vertical location (e.g., to not obscure transmitting or receiving paths corresponding to other exposures or laser pulses). The motion compensation system 300 further includes a single stepping fold mirror that adjusts (e.g., pivots) its angle of reflection (such as between laser pulses) to one of four different angles corresponding to the different paths and stationary fold mirrors. The motion compensation system 300 further illustrates a fixed TX or RX lens, such as a laser beam spreader or focusing lens for the transmitting path or receiving path, respectively (or such as for a transmitting aperture or receiving aperture, respectively).

Each transmitting path emits a spreading laser beam from the TX lens (e.g., through the same transmitting aperture) to the stepping fold mirror (adjusted to the transmitting path's corresponding angle of reflection) and then to the corresponding stationary fold mirror for directing the laser radiation to the target surface. Likewise, each receiving path receives a portion of the reflected laser radiation from the target surface and then from the corresponding stationary fold mirror to the stepping fold mirror (adjusted to the receiving path's corresponding angle of reflection) and then to the RX lens (e.g., through the same receiving aperture). The pulses (or other emitted portions) of laser radiation are coordinated (e.g., timed) with the relative motion of the platform to the target surface so that from the perspectives of the target surface receiving the laser radiation and the RX lens receiving the reflected laser radiation, the platform is not moving with respect to the target surface.

Figure 4:
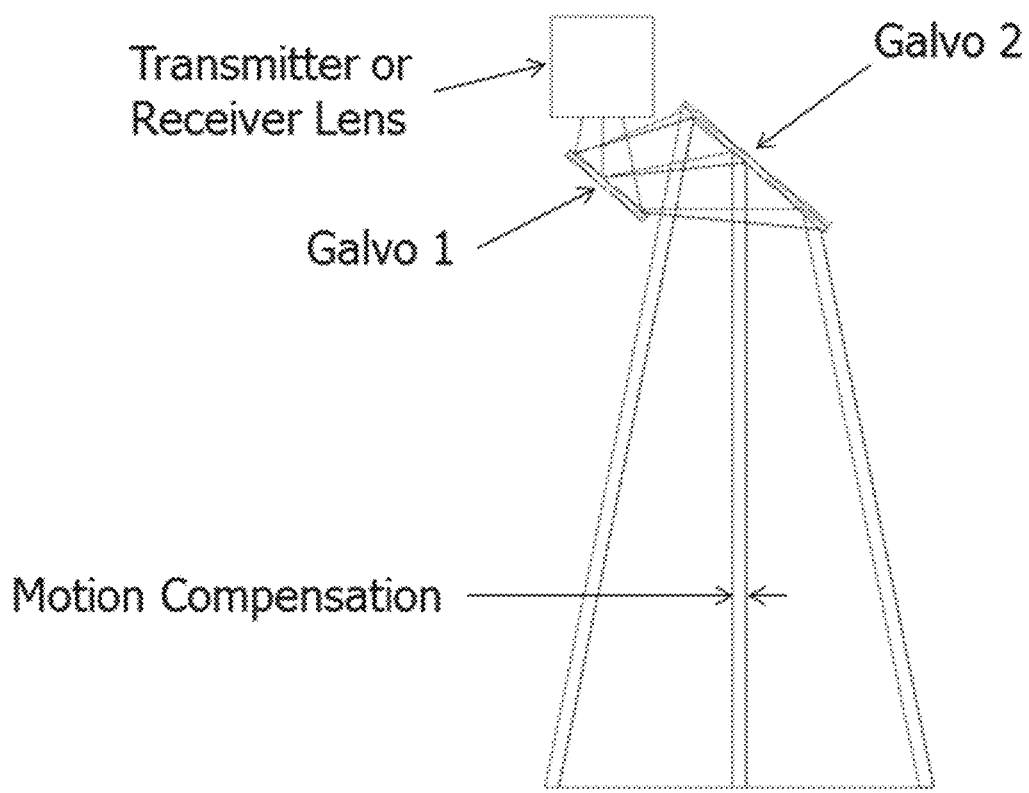
FIG. 4 is a schematic diagram of an example motion compensation system for a shearography apparatus, such as the shearography apparatus of FIG. 2, according to another embodiment of the present disclosure.

FIG. 4 is a schematic diagram of an example motion compensation system 400 for a shearography apparatus, such as the shearography apparatus 200 of FIG. 2, according to another embodiment of the present disclosure. For brevity, description similar to that of FIG. 3 above may not be repeated. The motion compensation system 400 includes two adjustable mirrors labeled galvo 1 and galvo 2 and well as a transmitter or receiver lens (similar to the TX or RX lens of FIG. 3). Galvo 1 performs similarly to the stepping fold mirror of FIG. 3, while galvo 2 replaces the four stationary fold mirrors of FIG. 3 with a single adjustable fold mirror similar to galvo 1. While two paths (a left path and a right path in close proximity, from each of three different positions in the transmitting or receiving paths) are illustrated in FIG. 4, there is no limit to the number of such paths, each using a different corresponding pair of angles of reflection for galvo 1 and galvo 2, with all paths sharing the same transmitting aperture or receiving aperture.

Each such path corresponds to a different shot having a different offset, separation, or displacement in the motion direction. For mirrors of similar size to those in FIG. 3, the corresponding displacements from the different angles of reflection for galvo 2 in FIG. 4 are considerably smaller than the horizontal distances between stationary fold mirrors in FIG. 3. As such, the motion compensation system 400 may be more appropriate for slower moving platforms, such as ground-based platforms like UGVs. Phase-resolved shearography can still be accomplished with the use of four such shots appropriately separated in the motion direction together with an image-shearing device able to adjust one of the images used to produce a specklegram by the appropriate phase offsets (e.g., no offset, one-quarter wavelength offset, three-quarters wavelength offset, one wavelength offset).

Each transmitting path emits a spreading laser beam from the TX lens or transmitting aperture to galvo 1 (adjusted to the transmitting path's corresponding angle of reflection) and then to galvo 2 (adjusted to the corresponding angle of reflection) for directing the laser radiation to the target surface. Likewise, each receiving path receives a portion of the reflected laser radiation from the target surface and then from galvo 2 (adjusted to the receiving path's corresponding angle of reflection) to galvo 1 (adjusted to the corresponding angle of reflection) and then to the RX lens or receiving aperture. The pulses (or other emitted portions) of laser radiation are coordinated (e.g., timed) with the relative motion of the platform to the target surface so that from the perspectives of the target surface receiving the laser radiation and the RX lens receiving the reflected laser radiation, the platform is not moving with respect to the target surface. Numerous other embodiments and system configurations will be apparent in light of this disclosure.

Methodology

Figure 5:
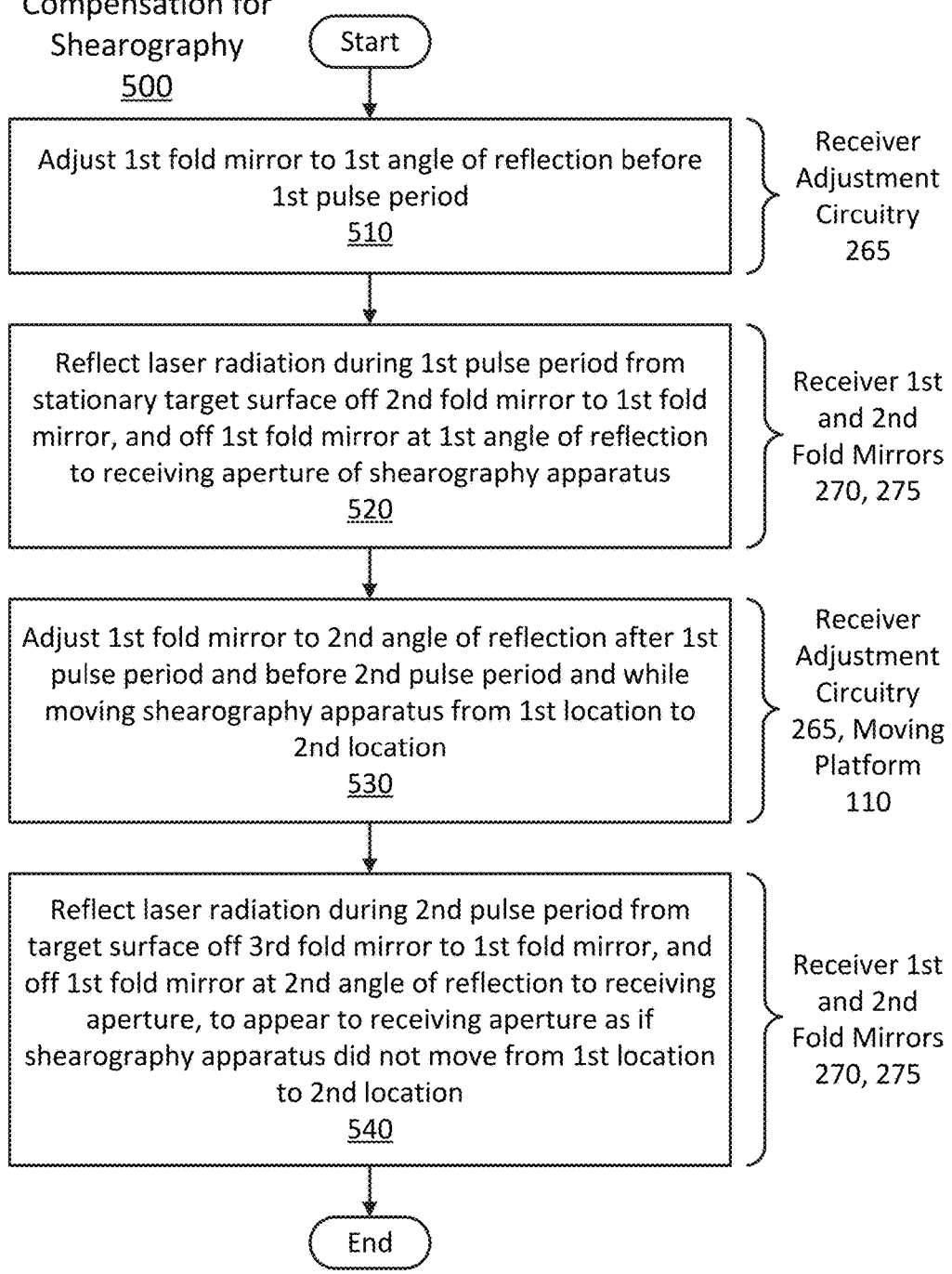
FIG. 5 is a flow diagram of an example method of motion compensation for a shearography apparatus, such as the shearography apparatus of FIG. 2 with the motion compensation system of FIG. 3, according to an embodiment of the present disclosure.

FIG. 5 is a flow diagram of an example method 500 of motion compensation for a shearography apparatus, such as the shearography apparatus 200 of FIG. 2 with the motion compensation system 300 of FIG. 3, according to an embodiment of the present disclosure. The method 500 and other methods described herein may be implemented in hardware or combinations of hardware and software. For example, the method 500 may be implemented by the shearography components and techniques of FIGS. 1-3. Throughout the description of the method 500, references may be made to example corresponding components or aspects of FIGS. 1-3. In another embodiment, the method 500 may be implemented by a custom circuit such as a read-only integrated circuit (ROIC) with custom processing circuits (such as an FPGA), optics, and laser generation configured to carry out the method 500. In other embodiments, the method 500 may be performed in conjunction with a special purpose processor, such as a signal processor.

In some other embodiments, parts of the method 500 may be implemented as a series of computer instructions, such as software, firmware, or a combination of the two, together with one or more computer processors (e.g., one or more microprocessors). The instructions, when executed on a given processor, cause portions of the method 500 to be performed. For example, in one or more embodiments, a computer program product is provided. The computer program product includes one or more non-transitory machine-readable mediums (such as a compact disc, a DVD, a solid-state drive, a hard drive, RAM, ROM, on-chip processor cache, or the like) encoded with instructions that when executed by one or more processors cause portions of the method 500 (or other method described herein) to be carried out for motion compensation of a shearography apparatus. In addition, while the methods described herein may appear to have a certain order to their operations, other embodiments may not be so limited. Accordingly, the order of the operations can be varied between embodiments, as would be apparent in light of this disclosure.

In a similar light, the components in FIGS. 1-4 and other circuits disclosed herein may be custom hardware circuits or general-purpose computer hardware configured (e.g., through software, firmware, programmable logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit.

Referring to the method 500 of FIG. 5, processing begins with adjusting 510, by adjustment circuitry (such as receiver adjustment circuitry 265, a first fold mirror (such as receiving first fold mirror 270) to a first angle of reflection before a first pulse period. The method 500 further includes reflecting 520, by a second fold mirror (such as one of the receiver second fold mirrors 275), laser radiation during the first pulse period from a stationary target surface (such as target surface 140 to the first fold mirror, and then by the first fold mirror at the first angle of reflection to a receiving aperture (such as the RX lens of FIG. 3) of the shearography apparatus.

The method 500 further includes adjusting 530, by the adjustment circuitry, the first fold mirror to a second angle of reflection after the first pulse period and before a second pulse period and while moving, by a platform (such as moving platform 110) housing the shearography apparatus, the shearography apparatus from a first location to a second location. The method further includes reflecting 540, by a third fold mirror (such as another one of the receiver second fold mirrors 275), laser radiation during the second pulse period from the target surface to the first fold mirror, and then by the first fold mirror at the second angle of reflection to the receiving aperture, to appear to the receiving aperture as if the shearography apparatus did not move from the first location to the second location.

FIG. 6 is a flow diagram of an example method 600 of motion compensation for a shearography apparatus, such as the shearography apparatus 200 of FIG. 2 with the motion compensation system 400 of FIG. 4, according to an embodiment of the present disclosure. Referring to the method 600, processing begins with adjusting 610, by adjustment circuitry, a first fold mirror to a first angle of reflection and a second fold mirror (such as receiving second fold mirror 275) to a second angle of reflection before a first pulse period. The method 600 further includes reflecting 620, by the second fold mirror at the second angle of reflection, laser radiation during the first pulse period from a stationary target surface to the first fold mirror, and then by the first fold mirror at the first angle of reflection to a receiving aperture of the shearography apparatus.

The method 600 further includes adjusting 630, by the adjustment circuitry, the first fold mirror to a third angle of reflection and the second fold mirror to a fourth angle of reflection after the first pulse period and before a second pulse period and while moving, by a platform housing the shearography apparatus, the shearography apparatus from a first location to a second location. The method 600 further includes reflecting 640, by the second fold mirror at the fourth angle of reflection, laser radiation during the second pulse period from the target surface to the first fold mirror, and then by the first fold mirror at the third angle of reflection to the receiving aperture, to appear to the receiving aperture as if the shearography apparatus did not move from the first location to the second location. Numerous other techniques and methods will be apparent in light of this disclosure.

Further Example Embodiments

The following examples pertain to further embodiments, from which numerous permutations and configurations will be apparent.

Example 1 is a motion compensation system for a shearography apparatus, the motion compensation system including: an adjustable first fold mirror to reflect laser radiation to a receiving aperture of the shearography apparatus during separate pulse periods at corresponding angles of reflection; and corresponding second fold mirrors to reflect the laser radiation from a target surface to the first fold mirror during the respective pulse periods, wherein the shearography apparatus is to move with respect to the target surface between the separate pulse periods, and wherein the angles of reflection of the first fold mirror are to make the laser radiation reflected from the target surface via the respective second fold mirrors appear to the receiving aperture as if the shearography apparatus is substantially stationary with respect to the target surface.

Example 2 includes the motion compensation system of Example 1, wherein the corresponding second fold mirrors comprise three or more said second fold mirrors, and the separate pulse periods include three or more said pulse periods during which the first fold mirror is set at a corresponding three or more said angles of reflection to reflect the laser radiation from the corresponding three or more second fold mirrors.

Example 3 includes the motion compensation system of Example 1, wherein the corresponding second fold mirrors comprise four or more said second fold mirrors, and the separate pulse periods include four or more said pulse periods during which the first fold mirror is set at a corresponding four or more said angles of reflection to reflect the laser radiation from the corresponding four or more second fold mirrors.

Example 4 includes the motion compensation system of Example 1, wherein the shearography apparatus is configured to perform phase-resolved shearography.

Example 5 includes the motion compensation system of Example 1, further including adjustment circuitry to adjust the first fold mirror to the corresponding angles of reflection before the respective pulse periods.

Example 6 includes the motion compensation system of Example 1, wherein the first fold mirror is a receiving first fold mirror, the angles of reflection are receiving angles of reflection, the second fold mirrors are receiving second fold mirrors, and the motion compensation system further includes: an adjustable transmitting first fold mirror to reflect the laser radiation from a transmitting aperture of the shearography apparatus during the separate pulse periods at corresponding transmitting angles of reflection; and corresponding transmitting second fold mirrors to reflect the laser radiation from the transmitting first fold mirror to the target surface during the respective pulse periods, wherein the transmitting angles of reflection are to make the laser radiation emitted from the transmitting aperture via the respective second fold mirrors appear to the target surface as if the shearography apparatus is stationary with respect to the target surface.

Example 7 includes the motion compensation system of Example 1, further including corresponding lasers to emit the laser radiation to the target surface during the respective pulse periods, to appear to the target surface as if the shearography apparatus is stationary with respect to the target surface.

Example 8 is a motion compensation system for a shearography apparatus, the motion compensation system including: an adjustable first fold mirror to reflect laser radiation to a receiving aperture of the shearography apparatus during separate pulse periods at corresponding first angles of reflection; and an adjustable second fold mirror to reflect the laser radiation from a target surface to the first fold mirror during the respective pulse periods at corresponding second angles of reflection, wherein the shearography apparatus is to move with respect to the target surface between the separate pulse periods, and wherein the first and second angles of reflection are to make the laser radiation reflected from the target surface appear to the receiving aperture as if the shearography apparatus is stationary with respect to the target surface.

Example 9 includes the motion compensation system of Example 8, wherein the separate pulse periods include four or more said pulse periods during which the first fold mirror is at a corresponding four or more said first angles of reflection to reflect the laser radiation from the second fold mirror at a corresponding four or more said second angles of reflection, and the shearography apparatus is configured to perform phase-resolved shearography.

Example 10 includes the motion compensation system of Example 8, further including adjustment circuitry to adjust the first fold mirror to the corresponding first angles of reflection and the second fold mirror to the corresponding second angles of reflection before the respective pulse periods.

Example 11 includes the motion compensation system of Example 8, wherein the first fold mirror is a receiving first fold mirror, the first angles of reflection are receiving first angles of reflection, the second fold mirror is a receiving second fold mirror, the second angles of reflection are receiving second angles of reflection, and the motion compensation system further includes: an adjustable transmitting first fold mirror to reflect the laser radiation from a transmitting aperture of the shearography apparatus during the separate pulse periods at corresponding transmitting first angles of reflection; and an adjustable transmitting second fold mirror to reflect the laser radiation from the transmitting first fold mirror to the target surface during the respective pulse periods at corresponding transmitting second angles of reflection, wherein the transmitting first and second angles of reflection are to make the laser radiation emitted from the transmitting aperture appear to the target surface as if the shearography apparatus is stationary with respect to the target surface.

Example 12 is a method of motion compensation system for a shearography apparatus, the method including: adjusting, by adjustment circuitry, a first fold mirror to a first angle of reflection before a first pulse period; reflecting, by a second fold mirror, laser radiation during the first pulse period from a stationary target surface to the first fold mirror, and then by the first fold mirror at the first angle of reflection to a receiving aperture of the shearography apparatus; adjusting, by the adjustment circuitry, the first fold mirror to a second angle of reflection after the first pulse period and before a second pulse period and while moving, by a platform housing the shearography apparatus, the shearography apparatus from a first location to a second location; and reflecting, by a third fold mirror, laser radiation during the second pulse period from the target surface to the first fold mirror, and then by the first fold mirror at the second angle of reflection to the receiving aperture, to appear to the receiving aperture as if the shearography apparatus did not move from the first location to the second location.

Example 13 includes the method of Example 12, further including: adjusting, by the adjustment circuitry, the first fold mirror to a third angle of reflection after the second pulse period and before a third pulse period and while moving, by the platform, the shearography apparatus from the second location to a third location; and reflecting, by a fourth fold mirror, laser radiation during the third pulse period from the target surface to the first fold mirror, and then by the first fold mirror at the third angle of reflection to the receiving aperture, to appear to the receiving aperture as if the shearography apparatus did not move from the second location to the third location.

Example 14 includes the method of Example 13, further including: adjusting, by the adjustment circuitry, the first fold mirror to a fourth angle of reflection after the third pulse period and before a fourth pulse period and while moving, by the platform, the shearography apparatus from the third location to a fourth location; and reflecting, by a fifth fold mirror, laser radiation during the fourth pulse period from the target surface to the first fold mirror, and then by the first fold mirror at the fourth angle of reflection to the receiving aperture, to appear to the receiving aperture as if the shearography apparatus did not move from the third location to the fourth location.

Example 15 includes the method of Example 14, further including adjusting, by the adjustment circuitry to an image-shearing device of the shearography apparatus, phase offsets between separate said pulse periods to produce phase-resolved specklegrams by the image-shearing device from the corresponding reflected laser radiation at the receiving aperture.

Example 16 includes the method of Example 12, wherein the first fold mirror is a receiving first fold mirror, the first angle of reflection is a receiving first angle of reflection, the second fold mirror is a receiving second fold mirror, the second angle of reflection is a receiving second angle of reflection, the third fold mirror is a receiving third fold mirror, and the method further includes: adjusting, by the adjustment circuitry, a transmitting first fold mirror to a transmitting first angle of reflection before the first pulse period; reflecting, by the transmitting first fold mirror at the transmitting first angle of reflection, the laser radiation during the first pulse period from a transmitting aperture of the shearography apparatus to a transmitting second fold mirror, and then by the transmitting second fold mirror to the target surface; adjusting, by the adjustment circuitry, the transmitting first fold mirror to a transmitting second angle of reflection after the first pulse period and before the second pulse period; and reflecting, by the transmitting first fold mirror at the transmitting second angle of reflection, the laser radiation during the second pulse period from the transmitting aperture to a transmitting third fold mirror, and then by the transmitting third fold mirror to the target surface, to appear to the target surface as if the shearography apparatus did not move from the first location to the second location.

Example 17 includes the method of Example 12, further including: emitting, by a first laser, the laser radiation during the first pulse period to the target surface; and emitting, by a second laser, the laser radiation during the second pulse period to the target surface, to appear to the target surface as if the shearography apparatus did not move from the first location to the second location.

Example 18 is a method of motion compensation system for a shearography apparatus, the method including: adjusting, by adjustment circuitry, a first fold mirror to a first angle of reflection and a second fold mirror to a second angle of reflection before a first pulse period; reflecting, by the second fold mirror at the second angle of reflection, laser radiation during the first pulse period from a stationary target surface to the first fold mirror, and then by the first fold mirror at the first angle of reflection to a receiving aperture of the shearography apparatus; adjusting, by the adjustment circuitry, the first fold mirror to a third angle of reflection and the second fold mirror to a fourth angle of reflection after the first pulse period and before a second pulse period and while moving, by a platform housing the shearography apparatus, the shearography apparatus from a first location to a second location; and reflecting, by the second fold mirror at the fourth angle of reflection, laser radiation during the second pulse period from the target surface to the first fold mirror, and then by the first fold mirror at the third angle of reflection to the receiving aperture, to appear to the receiving aperture as if the shearography apparatus did not move from the first location to the second location.

Example 19 includes the method of Example 18, further including: adjusting, by the adjustment circuitry, the first fold mirror to a fifth angle of reflection and the second fold mirror to a sixth angle of reflection after the second pulse period and before a third pulse period and while moving, by the platform, the shearography apparatus from the second location to a third location; reflecting, by the second fold mirror at the sixth angle of reflection, laser radiation during the third pulse period from the target surface to the first fold mirror, and then by the first fold mirror at the fifth angle of reflection to the receiving aperture, to appear to the receiving aperture as if the shearography apparatus did not move from the second location to the third location; adjusting, by the adjustment circuitry, the first fold mirror to a seventh angle of reflection and the second fold mirror to an eighth angle of reflection after the third pulse period and before a fourth pulse period and while moving, by the platform, the shearography apparatus from the third location to a fourth location; reflecting, by the second fold mirror at the eighth angle of reflection, laser radiation during the fourth pulse period from the target surface to the first fold mirror, and then by the first fold mirror at the seventh angle of reflection to the receiving aperture, to appear to the receiving aperture as if the shearography apparatus did not move from the third location to the fourth location; and adjusting, by the adjustment circuitry to an image-shearing device of the shearography apparatus, phase offsets between separate said pulse periods to produce phase-resolved specklegrams by the image-shearing device from the corresponding reflected laser radiation at the receiving aperture.

Example 20 includes the method of Example 18, wherein the first fold mirror is a receiving first fold mirror, the first angle of reflection is a receiving first angle of reflection, the second fold mirror is a receiving second fold mirror, the second angle of reflection is a receiving second angle of reflection, the third angle of reflection is a receiving third angle of reflection, the fourth angle of reflection is a receiving fourth angle of reflection, and the method further includes: adjusting, by the adjustment circuitry, a transmitting first fold mirror to a transmitting first angle of reflection and a transmitting second fold mirror to a transmitting second angle of reflection before the first pulse period; reflecting, by the transmitting first fold mirror at the transmitting first angle of reflection, the laser radiation during the first pulse period from a transmitting aperture of the shearography apparatus to the transmitting second fold mirror, and then by the transmitting second fold mirror at the transmitting second angle of reflection to the target surface; adjusting, by the adjustment circuitry, the transmitting first fold mirror to a transmitting third angle of reflection and the transmitting second fold mirror to a transmitting fourth angle of reflection after the first pulse period and before the second pulse period; and reflecting, by the transmitting first fold mirror at the transmitting third angle of reflection, the laser radiation during the second pulse period from the transmitting aperture to the transmitting second fold mirror, and then by the transmitting second fold mirror at the transmitting second angle of reflection to the target surface, to appear to the target surface as if the shearography apparatus did not move from the first location to the second location.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A motion compensation system for a shearography apparatus, the motion compensation system comprising:
    an adjustable first fold mirror to reflect laser radiation to a receiving aperture of the shearography apparatus during separate pulse periods at corresponding angles of reflection; and
    corresponding second fold mirrors to reflect the laser radiation from a target surface to the first fold mirror during the respective pulse periods,
    wherein at least one of the target surface or the shearography apparatus is to move with respect to the other between the separate pulse periods, and
    wherein the angles of reflection of the first fold mirror are to make the laser radiation reflected from the target surface via the respective second fold mirrors appear to the receiving aperture as if the shearography apparatus is substantially stationary with respect to the target surface.

2. The motion compensation system of claim 1, wherein the corresponding second fold mirrors comprise three or more said second fold mirrors, and the separate pulse periods comprise three or more said pulse periods during which the first fold mirror is set at a corresponding three or more said angles of reflection to reflect the laser radiation from the corresponding three or more second fold mirrors.

3. The motion compensation system of claim 1, wherein the corresponding second fold mirrors comprise four or more said second fold mirrors, and the separate pulse periods comprise four or more said pulse periods during which the first fold mirror is set at a corresponding four or more said angles of reflection to reflect the laser radiation from the corresponding four or more second fold mirrors.

4. The motion compensation system of claim 1, wherein the shearography apparatus is configured to perform phase-resolved shearography.

5. The motion compensation system of claim 1, further comprising adjustment circuitry to adjust the first fold mirror to the corresponding angles of reflection before the respective pulse periods.

6. The motion compensation system of claim 1, wherein the first fold mirror is a receiving first fold mirror, the angles of reflection are receiving angles of reflection, the second fold mirrors are receiving second fold mirrors, and the motion compensation system further comprises:
    an adjustable transmitting first fold mirror to reflect the laser radiation from a transmitting aperture of the shearography apparatus during the separate pulse periods at corresponding transmitting angles of reflection; and corresponding transmitting second fold mirrors to reflect the laser radiation from the transmitting first fold mirror to the target surface during the respective pulse periods, wherein the transmitting angles of reflection are to make the laser radiation emitted from the transmitting aperture via the respective second fold mirrors appear to the target surface as if the shearography apparatus is stationary with respect to the target surface.

7. The motion compensation system of claim 1, further comprising corresponding lasers to emit the laser radiation to the target surface during the respective pulse periods, to appear to the target surface as if the shearography apparatus is stationary with respect to the target surface.

8. A motion compensation system for a shearography apparatus, the motion compensation system comprising:
an adjustable first fold mirror to reflect laser radiation to a receiving aperture of the shearography apparatus during separate pulse periods at corresponding first angles of reflection; and
an adjustable second fold mirror to reflect the laser radiation from a target surface to the first fold mirror during the respective pulse periods at corresponding second angles of reflection,
wherein at least one of the target surface or the shearography apparatus is to move with respect to the other between the separate pulse periods, and
wherein the first and second angles of reflection are to make the laser radiation reflected from the target surface appear to the receiving aperture as if the shearography apparatus is stationary with respect to the target surface.

9. The motion compensation system of claim 8, wherein the separate pulse periods comprise four or more said pulse periods during which the first fold mirror is at a corresponding four or more said first angles of reflection to reflect the laser radiation from the second fold mirror at a corresponding four or more said second angles of reflection, and the shearography apparatus is configured to perform phase-resolved shearography.

10. The motion compensation system of claim 8, further comprising adjustment circuitry to adjust the first fold mirror to the corresponding first angles of reflection and the second fold mirror to the corresponding second angles of reflection before the respective pulse periods.

11. The motion compensation system of claim 8, wherein the first fold mirror is a receiving first fold mirror, the first angles of reflection are receiving first angles of reflection, the second fold mirror is a receiving second fold mirror, the second angles of reflection are receiving second angles of reflection, and the motion compensation system further comprises:
an adjustable transmitting first fold mirror to reflect the laser radiation from a transmitting aperture of the shearography apparatus during the separate pulse periods at corresponding transmitting first angles of reflection; and
an adjustable transmitting second fold mirror to reflect the laser radiation from the transmitting first fold mirror to the target surface during the respective pulse periods at corresponding transmitting second angles of reflection, wherein the transmitting first and second angles of reflection are to make the laser radiation emitted from the transmitting aperture appear to the target surface as if the shearography apparatus is stationary with respect to the target surface.

12. A method of motion compensation system for a shearography apparatus, the method comprising:
adjusting, by adjustment circuitry, a first fold mirror to a first angle of reflection before a first pulse period;
reflecting, by a second fold mirror, laser radiation during the first pulse period from a stationary target surface to the first fold mirror, and then by the first fold mirror at the first angle of reflection to a receiving aperture of the shearography apparatus;
adjusting, by the adjustment circuitry, the first fold mirror to a second angle of reflection after the first pulse period and before a second pulse period and while moving, by a platform housing the shearography apparatus, the shearography apparatus from a first location to a second location; and
reflecting, by a third fold mirror, laser radiation during the second pulse period from the target surface to the first fold mirror, and then by the first fold mirror at the second angle of reflection to the receiving aperture, to appear to the receiving aperture as if the shearography apparatus did not move from the first location to the second location.

13. The method of claim 12, further comprising:
adjusting, by the adjustment circuitry, the first fold mirror to a third angle of reflection after the second pulse period and before a third pulse period and while moving, by the platform, the shearography apparatus from the second location to a third location; and
reflecting, by a fourth fold mirror, laser radiation during the third pulse period from the target surface to the first fold mirror, and then by the first fold mirror at the third angle of reflection to the receiving aperture, to appear to the receiving aperture as if the shearography apparatus did not move from the second location to the third location.

14. The method of claim 13, further comprising:
adjusting, by the adjustment circuitry, the first fold mirror to a fourth angle of reflection after the third pulse period and before a fourth pulse period and while moving, by the platform, the shearography apparatus from the third location to a fourth location; and
reflecting, by a fifth fold mirror, laser radiation during the fourth pulse period from the target surface to the first fold mirror, and then by the first fold mirror at the fourth angle of reflection to the receiving aperture, to appear to the receiving aperture as if the shearography apparatus did not move from the third location to the fourth location.

15. The method of claim 14, further comprising adjusting, by the adjustment circuitry to an image-shearing device of the shearography apparatus, phase offsets between separate said pulse periods to produce phase-resolved specklegrams by the image-shearing device from the corresponding reflected laser radiation at the receiving aperture.

16. The method of claim 12, wherein the first fold mirror is a receiving first fold mirror, the first angle of reflection is a receiving first angle of reflection, the second fold mirror is a receiving second fold mirror, the second angle of reflection is a receiving second angle of reflection, the third fold mirror is a receiving third fold mirror, and the method further comprises:
adjusting, by the adjustment circuitry, a transmitting first fold mirror to a transmitting first angle of reflection before the first pulse period;

reflecting, by the transmitting first fold mirror at the transmitting first angle of reflection, the laser radiation during the first pulse period from a transmitting aperture of the shearography apparatus to a transmitting second fold mirror, and then by the transmitting second fold mirror to the target surface;

adjusting, by the adjustment circuitry, the transmitting first fold mirror to a transmitting second angle of reflection after the first pulse period and before the second pulse period; and reflecting, by the transmitting first fold mirror at the transmitting second angle of reflection, the laser radiation during the second pulse period from the transmitting aperture to a transmitting third fold mirror, and then by the transmitting third fold mirror to the target surface, to appear to the target surface as if the shearography apparatus did not move from the first location to the second location.

17. The method of claim 12, further comprising:

emitting, by a first laser, the laser radiation during the first pulse period to the target surface; and emitting, by a second laser, the laser radiation during the second pulse period to the target surface, to appear to the target surface as if the shearography apparatus did not move from the first location to the second location.

18. A method of motion compensation system for a shearography apparatus, the method comprising:

adjusting, by adjustment circuitry, a first fold mirror to a first angle of reflection and a second fold mirror to a second angle of reflection before a first pulse period;

reflecting, by the second fold mirror at the second angle of reflection, laser radiation during the first pulse period from a stationary target surface to the first fold mirror, and then by the first fold mirror at the first angle of reflection to a receiving aperture of the shearography apparatus;

adjusting, by the adjustment circuitry, the first fold mirror to a third angle of reflection and the second fold mirror to a fourth angle of reflection after the first pulse period and before a second pulse period and while moving, by a platform housing the shearography apparatus, the shearography apparatus from a first location to a second location; and reflecting, by the second fold mirror at the fourth angle of reflection, laser radiation during the second pulse period from the target surface to the first fold mirror, and then by the first fold mirror at the third angle of reflection to the receiving aperture, to appear to the receiving aperture as if the shearography apparatus did not move from the first location to the second location.

19. The method of claim 18, further comprising:

adjusting, by the adjustment circuitry, the first fold mirror to a fifth angle of reflection and the second fold mirror to a sixth angle of reflection after the second pulse period and before a third pulse period and while moving, by the platform, the shearography apparatus from the second location to a third location;

reflecting, by the second fold mirror at the sixth angle of reflection, laser radiation during the third pulse period from the target surface to the first fold mirror, and then by the first fold mirror at the fifth angle of reflection to the receiving aperture, to appear to the receiving aperture as if the shearography apparatus did not move from the second location to the third location;

adjusting, by the adjustment circuitry, the first fold mirror to a seventh angle of reflection and the second fold mirror to an eighth angle of reflection after the third pulse period and before a fourth pulse period and while moving, by the platform, the shearography apparatus from the third location to a fourth location;

reflecting, by the second fold mirror at the eighth angle of reflection, laser radiation during the fourth pulse period from the target surface to the first fold mirror, and then by the first fold mirror at the seventh angle of reflection to the receiving aperture, to appear to the receiving aperture as if the shearography apparatus did not move from the third location to the fourth location; and adjusting, by the adjustment circuitry to an image-shearing device of the shearography apparatus, phase offsets between separate said pulse periods to produce phase-resolved specklegrams by the image-shearing device from the corresponding reflected laser radiation at the receiving aperture.

20. The method of claim 18, wherein the first fold mirror is a receiving first fold mirror, the first angle of reflection is a receiving first angle of reflection, the second fold mirror is a receiving second fold mirror, the second angle of reflection is a receiving second angle of reflection, the third angle of reflection is a receiving third angle of reflection, the fourth angle of reflection is a receiving fourth angle of reflection, and the method further comprises:

adjusting, by the adjustment circuitry, a transmitting first fold mirror to a transmitting first angle of reflection and a transmitting second fold mirror to a transmitting second angle of reflection before the first pulse period;

reflecting, by the transmitting first fold mirror at the transmitting first angle of reflection, the laser radiation during the first pulse period from a transmitting aperture of the shearography apparatus to the transmitting second fold mirror, and then by the transmitting second fold mirror at the transmitting second angle of reflection to the target surface;

adjusting, by the adjustment circuitry, the transmitting first fold mirror to a transmitting third angle of reflection and the transmitting second fold mirror to a transmitting fourth angle of reflection after the first pulse period and before the second pulse period; and reflecting, by the transmitting first fold mirror at the transmitting third angle of reflection, the laser radiation during the second pulse period from the transmitting aperture to the transmitting second fold mirror, and then by the transmitting second fold mirror at the transmitting second angle of reflection to the target surface, to appear to the target surface as if the shearography apparatus did not move from the first location to the second location.

\* \* \* \* \*